(No Model.) 2 Sheets—Sheet 1.

N. MOES.
DEVICE FOR COOLING MILK AND SEPARATING CREAM.

No. 370,205. Patented Sept. 20, 1887.

Witnesses:
J. A. Rutherford
Robert Everett

Inventor:
Nicholas Moes
By James L. Norris
Atty.

(No Model.) 2 Sheets—Sheet 2.
N. MOES.
DEVICE FOR COOLING MILK AND SEPARATING CREAM.
No. 370,205. Patented Sept. 20, 1887.
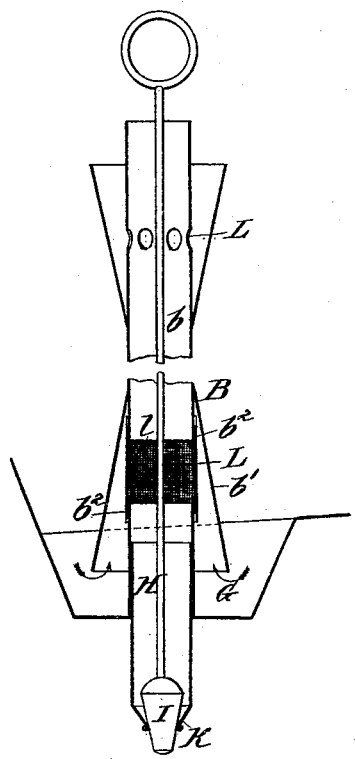
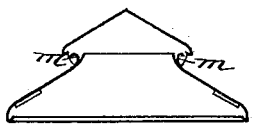
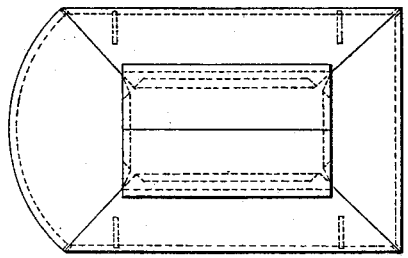
Witnesses.
Inventor:
Nicholas Moes.
By James L. Norris
Atty.

UNITED STATES PATENT OFFICE.

NICOLAS MOES, OF REDINGEN-UPON-ATTERT, LUXEMBURG.

DEVICE FOR COOLING MILK AND SEPARATING CREAM.

SPECIFICATION forming part of Letters Patent No. 370,205, dated September 20, 1887.

Application filed May 3, 1887. Serial No. 236,999. (No model.) Patented in France September 10, 1885, No. 171,125; in Belgium September 11, 1885, No. 70,175; in England June 7, 1886, No. 7,643, and in Germany October 12, 1886, No. 37,200.

*To all whom it may concern:*

Be it known that I, NICOLAS MOES, a citizen of the Grand Duchy of Luxemburg, and a resident of Redingen-upon-Attert, Luxemburg, have invented new and useful Improvements in Apparatus for Cooling Milk and Separating Cream Therefrom, (for which I have obtained patents in Great Britain, No. 7,643, dated June 7, 1886; in France, No. 171,125, dated September 10, 1885; in Belgium, No. 70,175, dated September 11, 1885, and in Germany, No. 37,200, dated October 12, 1886,) of which the following is a specification, reference being had to the accompanying drawings.

This invention relates to apparatus for cooling milk and separating cream therefrom.

The said invention is illustrated in the accompanying drawings, in which—

Figure 1:
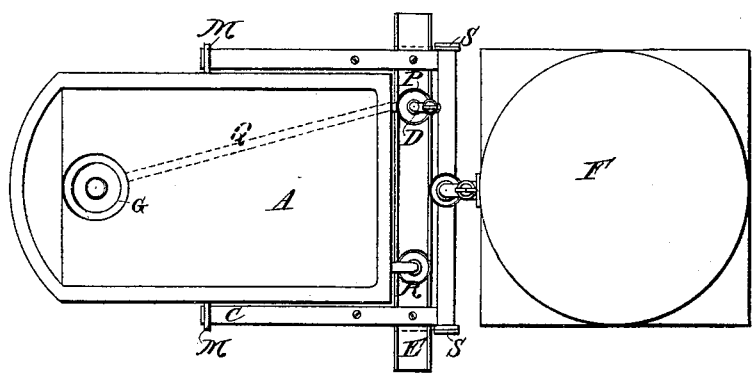
Figure 2:
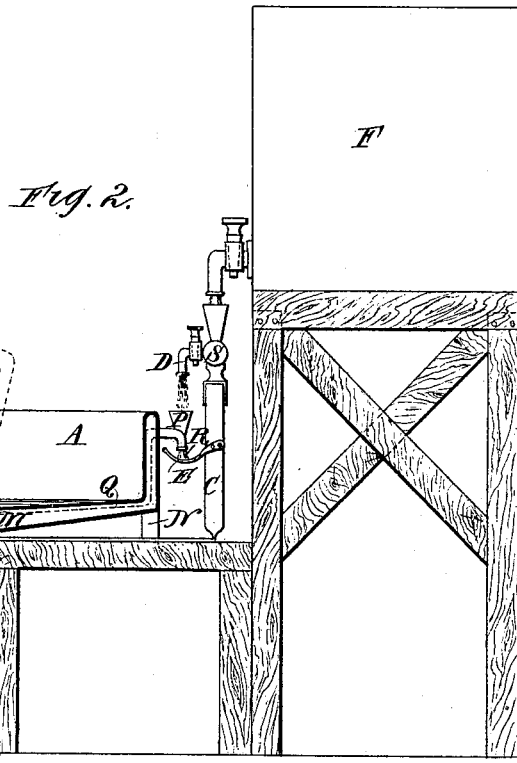

Figure 1 is a plan of the improved apparatus. Fig. 2 is a sectional elevation of the same; and Fig. 3 is a vertical section of the separator, drawn to an enlarged scale, and showing a slight modification. Fig. 4 is a plan of a cover for covering the milk-pan, and Fig. 5 is a transverse section of the same.

The improved apparatus consists, essentially, of the milk basin or pan A, having a double wall and bottom for cooling the milk by means of water or air at will, the device B, for separating the milk and cream, the device D, for introducing water into the double bottom, the channel E, for receiving the water discharged from the said double bottom, and the water-reservoir F.

The principal feature of the said invention consists in the novel means employed for separating the milk and cream. For this purpose a recess or well, G, is formed at one end of the pan A. From the bottom of this well projects a small hollow cylinder, H. The separator B, which consists of a pipe, $b$, having a series of openings or perforations, L, at a suitable height for the outflow of the milk, and provided with a shield, $b'$, over the said openings, is fitted at its lower end upon the upper projecting portion of the cylinder H, and forms a continuation thereof. The perforations L are preferably formed by placing a piece of wire-gauze, $l$, around the tube $b$, as shown in Fig. 3, the sides of the said tube, with the exception of the strips $b^2$, which serve to support the gauze, being cut away at this part. If desired, however, the perforations may be formed as shown in Fig. 2.

When the separator B is in position, the stopper I, which is provided with a rod to facilitate the handling of the stopper, is inserted into the opening K, which is made somewhat smaller than the opening at the upper end of the cylinder, so as to form a seat for the said stopper. After the cream has risen from the milk and floats upon the surface of the latter, the stopper I, which is composed of india-rubber or other suitable material, is lifted. The milk, by reason of the particular arrangement of the exterior shield, $b'$, of the separator B, then flows through the well G in the direction of the arrows, depositing therein any impurities which it may contain, and then ascends between the said shield and the pipe $b$ and flows out through the perforations L. The height of the perforations L must correspond with the quantity of cream, so that the latter cannot flow out until after the device B has been entirely removed. When, however, the said separator is removed, the cream flows directly through the cylinder H.

A little skim-milk, level with the top of the small cylinder H, remains in the well G after the discharge of the cream. This milk can be removed, with the impurities which may be contained therein, by tilting the pan, as shown by dotted lines in Fig. 2.

The rear part of the pan rests upon the support N, and its front part is carried upon a transverse axis, M, which is attached to the bottom of the pan, and which has its bearing in the support C. By reason of this arrangement the pan can be easily tilted, which is of great convenience for removing the skim-milk remaining in the well G, as before described, and also for cleaning the pan, so that in each of these operations the said pan can remain upon its support.

In order to cool the milk by means of air, which cooling will be sufficient in winter, a small opening, O, is formed at the front part of the pan, as shown in Fig. 2, and an outlet, R, is formed at the rear end. In this case a natural circulation is produced, owing to the milk warming the air between the double walls.

When the cooling is effected by water, the latter enters the funnel P through the cock D, and is thence conducted through a tube, Q, which is in the double bottom of the pan, to the wall of the well G, against which it runs, and whereby it is equally divided toward the right and left. The water thence returns and flows out at R into the channel E. In this case a plug or cork is inserted in the opening O. The support C carries, at its rear part beyond the pan, the pipe S, through which the refrigerating-water passes into the apparatus. The channel E, into which the water is discharged, is attached by means of screws to the said support C; but it may be connected to any suitable plate or table.

If several pans are to be used together, which is ordinarily the case, it is only necessary to prolong the water-pipe S, which supplies the apparatus, and the trough for removing the waste-water.

In Figs. 4 and 5 I show a cover which I generally employ in connection with my improved apparatus. This cover is adapted to fit over the milk-pan, and is provided with apertures $m$ at the top, in order to permit the circulation of air and the escape of any exhalations from the milk.

What I claim is—

1. The combination, with a milk-pan having a well through the bottom of which passes a pipe or hollow cylinder, of a tube adapted to fit on or form a continuation of the said cylinder and having a series of holes or perforations covered by a shield, all substantially as and for the purpose specified.

2. The combination, with a milk-pan, A, having double side walls and bottom, a well, G, and cylinder H, of means for causing a circulation of water or air through the said walls and bottom, and the separator B, comprising a pipe fitted to said cylinder and having openings or perforations L, and a shield, $b'$, mounted on the pipe over said openings or perforations, substantially as described.

In testimony whereof I have hereunto signed my name in the presence of two subscribing witnesses.

NICOLAS MOES.

Witnesses:
EMILE JUOLILOD,
CHARLES DUMONT.